United States Patent [19]

Ramig, Jr. et al.

[11] 3,945,965

[45] Mar. 23, 1976

[54] MIXTURES OF TITANIUM DIOXIDE AND POROUS SYNTHETIC MAGNESIUM SILICATE IN OPACIFIED EMULSION PAINTS

[75] Inventors: Alexander Ramig, Jr., Brunswick; Stephen T. Bowell, North Olmsted, both of Ohio

[73] Assignee: SCM Corporation, New York, N.Y.

[22] Filed: May 24, 1974

[21] Appl. No.: 472,979

[52] U.S. Cl.... 260/29.6 MM; 106/306; 260/29.6 E; 260/29.6 R; 260/42.55
[51] Int. Cl.² .......................................... C08J 3/20
[58] Field of Search... 260/29.6 R, 29.6 MM, 42.55, 260/29.6 E; 423/331; 106/306

[56] References Cited
UNITED STATES PATENTS

| | | | |
|---|---|---|---|
| 3,215,660 | 11/1965 | Bryan et al. | 260/29.6 MM |
| 3,247,006 | 4/1966 | Hoge et al. | 260/29.6 MM |
| 3,669,899 | 6/1972 | Vassiliades et al. | 260/42.55 |
| 3,838,085 | 9/1974 | Myers et al. | 423/331 |
| 3,839,253 | 10/1974 | Kershaw et al. | 260/29.6 MM |
| 3,844,990 | 10/1974 | Lindemann et al. | 260/42.55 |

FOREIGN PATENTS OR APPLICATIONS

| | | | |
|---|---|---|---|
| 666,992 | 7/1963 | Canada | 423/331 |

OTHER PUBLICATIONS

Chemical Abstracts, Vol. 79, 1973, p. 20364F, Seiner et al.

*Primary Examiner*—Eugene C. Rzucidlo
*Attorney, Agent, or Firm*—Thomas M. Schmitz

[57] ABSTRACT

An improved opacified aqueous latex paint containing film-forming latex binder having the major weight portion of latex polymer particles not smaller than about 1000 A, and opacifying pigment wherein at least about 1% by weight of the opacifying pigment is porous synthetic magnesium silicate. The porous magnesium silicate has an average particle size of about 5 to 20 microns and porosity comprising a plurality of pores between 0.03 microns to 0.9 microns.

2 Claims, No Drawings

MIXTURES OF TITANIUM DIOXIDE AND POROUS SYNTHETIC MAGNESIUM SILICATE IN OPACIFIED EMULSION PAINTS

BACKGROUND OF THE INVENTION

This invention relates to improved opacified latex emulsion paints. Latex paints are very popular due to their coating effectiveness, opacifying properties, and their ease of application. For example, SPRED SATIN, a trademark of SCM Corporation, identifies a typical latex emulsion paint. Conventionally opacified latex emulsion paints generally include in an aqueous dispersion: water, opacifying pigment, filler pigment, aqueous compounded film-forming latex, usually bodying agents, and dispersing assistants. Other conventional latex paint ingredients can include, for example, pesticides, odorants, flow control agents, bubble breakers, defoamers, plasticizers, adhesion promoters, coalescing solvents, tinting agents, anti-freeze agents, and pH buffers. Numerous specialty latex paints are known, such as disclosed in Ramig application Ser. No. 345,301 filed Mar. 27, 1973, now abandoned; U.S. Pat. No. 3,280,030; U.S. Pat. No. 3,447,940; British Pat. No. 811,425, and the same are incorporated herein by reference.

Most conventional opacified latex emulsion paints rely primarily on titanium dioxide as an opacifying pigment. It now has been found that substantial opacification is achieved by the inclusion of porous synthetic magnesium silicate as an opacifying pigment whereby excellent opacification can be achieved without conventional $TiO_2$ opacifying pigment. The opacification achieved in the latex paint of this invention by the inclusion of the porous magnesium silicate is particularly surprising since standard non-porous magnesium silicates have little or no opacifying properties when used in conventional oil-based paints typically referred to as alkyd paints.

Accordingly, it is a primary object of this invention to provide an improved opacified emulsion latex paint containing porous synthetic magnesium silicate as an opacifying pigment whereby $TiO_2$ can be partially or completely eliminated. Improved opacity can be achieved without diminishing other physical properties of paint films.

These and other advantages of this invention will become more apparent by referring to the Detailed Description of the Invention.

SUMMARY OF THE INVENTION

The improved aqueous latex emulsion paint comprises a film-forming latex binder having a preponderance of film-forming latex polymer particles not smaller than about 1000 A in diameter and opacifying pigment. The latex paint contains between about 30 to 75 weight percent solids wherein the paint contains between about 4 to 25 weight percent of porous magnesium silicate. On a dry solids volume basis, the paint consists essentially of 20% to 80% film-forming binder, 5% to 50% opacifying pigment wherein about 1% to 30% is porous synthetic magnesium silicate.

DETAILED DESCRIPTION OF THE INVENTION

The latex emulsion paint of this invention comprises film-forming latex binder and opacifying pigment. About 1% to 10% of opacifying pigment is synthetic magnesium silicate. The paint dries to an improved opacified paint film wherein the film-forming latex binder will coalesce into a matrix and the other components remain dispersed therein.

Aqueous compounded latices are emulsions of a very broad class of synthetic resins suitable for compounding into latex paints and are often called paint latices. The film-forming latices are a film-forming latex polymer binder having the major weight portion of the latex polymer particles not smaller than about 1000 A. Polymer particle diameter can be determined in accordance with the procedure described by S. H. Maron, "Journal of Applied Physics," Vol. 23, p. 900 (August, 1952). Suitable film-forming latex binders when compounded with plasticizers, solvents, and the like, have a glass transition temperature suitable for coalescence into a film under the curing conditions. Glass transition can be measured in accordance with the test set forth in 41 Journal of Paint Technology, pages 167–178 (1969). Thus, when air drying paints at ordinary temperatures of about 25°C the film-forming latex binder will have a glass transition temperature not above about 20°C. Preferably the glass transition temperature is about 10°C whereby the film-forming latex binder will coalesce and form a film upon exposure to air at ambient room temperature. Similarly, where the paint film is to be force dried, such as by heating in an oven, the glass transition temperature for the film-forming latex binder can be substantially higher, that is, about 30°C to about 190°C, or even as high as 220°C, provided that the latex binder will form a continuous film and coalesce under the force drying conditions.

Typical polymeric film-forming binders suitable for the emulsion paint of this invention and adapted to be applied at room temperature or oven temperatures (force dry) include a wide variety of polymers and copolymers such as, for example, those polymers and copolymers containing units of vinyl acetate, acrylates, methacrylates, isoprene, butadiene, styrene, alkylated styrene and/or dibutyl maleate. Other film-forming binders useful for air dry or force drying are polymers which include units of vinyl chloride, tetrafluoroethylene, ethylene, and acrylonitrile. Acrylic film-forming binders useful in this invention include polymers of methacrylic acid, acrylic acid, and mixtures thereof; copolymers and terpolymers of acrylic and/or methacrylic acid esters with styrene and/or vinyl acetate and copolymers or terpolymers of methacrylic acid esters and/or acrylic acid esters with acrylonitrile. Suitable film-forming latex binders include, therefore, those which are vinyl and vinylidene polymers and contain units such as vinyl acetate, vinyl chloride, vinylidene chloride, and the like; those which are hydrocarbon polymers and contain ethylene or propylene units and halogenated or oxygenated derivatives of ether, butadiene-vinyl toluene, isopropenestyrene, and the like; those which are acrylic and contain units of acrylic acid and methacrylic acid, their esters, and acrylonitrile; those polymers containing hydrocarbon, vinyl and/or acrylic unit reaction products of vinylic hydrocarbon monomers with unsaturated materials such as the reaction products of maleic acid with styrene; and broadly various resinous and elastomeric products obtainable in stable aqueous latex and capable of coalescing into a film-forming binder upon application as more particularly set forth in copending application Ser. No. 345,301 filed Mar. 27, 1973, and the same is incorporated herein by reference.

In accordance with this invention, porous synthetic magnesium silicates useful as an opacifying pigment are white, finely divided free-flowing powders consisting essentially of amorphous hydrous magnesium silicate. The amorphous structure of such silicates provides a large surface area to achieve a high surface-to-volume ratio. The surface area of the particles of the synthetic magnesium silicate may range from about 80 to 300 square meters per gram sample. The magnesium silicate is highly porous silicate having an average particle size between about 5 to 20 microns and having porosity of about 30% to 80% by volume. Porosity can be measured by mercury intrusion porosimetry using an American Instruments Co. prosimeter (Aminco Model 5-7121B). The pore diameters are not greater than about 1.5 microns and preferably between about 0.03 microns to 0.9 microns. Typically, the mol ratio of magnesium oxide ($MgO$) to silicon dioxide ($SiO_2$) in the magnesium silicate is about 1 mol $MgO$ to about 2.5 to 3 moles $SiO_2$. The absorptivity of the porous magnesium silicate may be as high as 200 milligrams KOH per gram magnesium silicate and the pH thereof is generally basic. Porous magnesium silicates are commercially available and a typical synthetic magnesium silicate is BriteSorb, a trademark of Philadelphia Quartz Company. Preferably, the paint contains at least about 4 to 25 weight percent of magnesium silicate whereby the latex paint contains between about 1% to 30% porous synthetic magnesium silicate on a dry solids volume basis. Although greater amounts of porous magnesium silicate imparts greater opacity, levels above about 30% (dry solid volume) render the film cheezy with considerable loss of integrity to the paint film. Accordingly, porous magnesium silicate is preferably combined with a conventional opacifying pigment such as titanium dioxide to obtain both improved opacity as well as good film integrity.

Preferably, other opacifying pigments are combined with the synthetic porous magnesium silicate and typically can include: rutile titanium dioxide, anatase titanium dioxide, lithopone, zinc sulfide, lead titanate, antimony oxide, zirconium oxide, titanium calcium, white lead, titanium barium, zinc oxide, leaded zinc oxide, and like white opacifying pigments and mixtures thereof. A desirable white inorganic pigment is rutile titanium dioxide having a weight average particle size between about 0.2 to 0.4 microns. Titanium dioxide can comprise a major portion of the opacifying pigments provided that at least about 1% by weight of the opacifying pigment is porous magnesium silicate in accordance with this invention. Other opacifying pigments, such as titanium yellows, and the like, may be utilized for opacification. Opacifying pigments for purposes of this invention have a refractive index of at least about 1.8 and comprise 5% to 50% of a latex paint on a dry solids volume basis of the paint. Preferably the opacifying pigments comprise major amounts of porous magnesium silicates and minor amounts of titanium dioxide.

Tinctorial pigments can be included in the paint composition for imparting a specific hue to the resulting latex emulsion paint. Tinctorial pigments are pigmentary materials and generally include, for example, ferrite yellow oxide, ferric oxide, "brown" iron oxide, tan oxide of iron, raw sienna and burnt sienna, raw and burnt umber, chromium oxide green, phthalocyanine green, ultramarine blue, carbon black, lampblack, toluidine red, parachlor red, cadmium reds and yellows, carmine red, chrome yellow, chrome orange, and azo complexes such as shown in U.S. Pat. No. 2,396,327. Tinctorial pigments comprise 0% to 20% of the latex paint on a dry solids volume basis.

Other conventional specialty pigmentary additives such as fluorescent, pearlescent, and opalescent materials can be broadly classified as tinctorial pigments since they impart special optical effects. Such specialty pigmentary additives can be added to impart specialty properties.

Fillers or extender pigments are often called inerts and include, for example, clays, silica, talc, mica, wollastonite, barytes, slate flour, calcium carbonate, and other conventional filler pigments which generally have low refractive indices. All pigments, including filler pigments, should not have a particle size greater than 44 microns and preferably are about 25 microns. Filler pigments can comprise about 0% to 60% of the latex on a dry solids volume basis.

While not intending to be bound by theory, the opacity of the dry paint film of this invention is thought to be due primarily to the microvoid structure in the porous synthetic magnesium silicate whereby air or other gas is entrapped in the microvoid structure. The microvoid structure in the paint film is maintained by controlling the diameter of the latex polymer particles of the latex binder and particularly by maintaining such particles greater than about 1000 A and between about 1000 A to 10,000 A. The pore diameter within the porous synthetic magnesium silicate is believed to be not penetrated by the film-forming latex binder thereby maintaining a microvoid structure in the dried paint film. It is quite surprising to find the substantially improved opacity is achieved by the porous magnesium silicate in combination with the latex film-forming binder. In contrast, porous magnesium silicate dispersed in oil-based binders or alkyd-type binders do not cause this phenomenon. Increased opacity in latex binder systems is substantially enhanced by the inclusion of other opacifying pigments such as $TiO_2$ which are dispersed adjacent to the microvoid structure of the porous magnesium silicate. It is believed that good dispersion of $TiO_2$ is achieved whereby $TiO_2$ pigment is adjacently disposed or juxtopositioned to the microvoids created by the porous magnesium silicate whereby scattering of light by the combination of $TiO_2$ and microvoids is substantially improved. Very little film-forming latex binder coalesces within the microvoid structure when the preponderance of the film-forming latex polymer particles are larger than about 1000 A and thus, enhances the interaction of the opacifying $TiO_2$ and the porous magnesium silicate.

The latex paint of this invention can be dispersed by conventional means for producing conventional latex paints. For example, a Cowles dissolver, sand mill, pebble mill, roller mill, or ball mill can be used to disperse the ingredients to form a uniform latex paint mixture.

The following examples illustrate ways in which the invention can be practiced, but shall not be construed as limiting.

EXAMPLE 1

High quality pigmented latex emulsion paints were prepared by dispersing the following indicated ingredients in a pebble mill for 24 hours to produce a latex paint.

| MATERIAL | PRIOR ART CONTROL (pounds) | PAINT A (pounds) | PAINT B (pounds) |
| --- | --- | --- | --- |
| Water | 363.9 | 363.8 | 364.0 |
| hydroxyethyl cellulose | 4.5 | 4.5 | 4.5 |
| 15% water solution of sodium salt of polymethacrylic acid | 5.0 | 5.1 | 4.8 |
| anti-foam agent | 2.0 | 2.0 | 2.0 |
| non-ionic surfactant of iso-octyl phenoxy polyethoxy ethanol containing 9–10 units of ethylene oxide per mole of phenol | 2.0 | 2.0 | 2.0 |
| 30% mixture of phenyl mercury acetate | 1.0 | 1.0 | 1.0 |
| rutile TiO$_2$ | 164.0 | 130.0 | 95.4 |
| calcined clay | 68.9 | 68.9 | 68.9 |
| calcium carbonate | 222.4 | 221.9 | 221.9 |
| synthetic porous magnesium silicate having an average particle size of 5 microns, a total porosity (by Hg penetration) of about 69%, and pore diameter ranging from 0.03 microns to 0.9 microns | 0 | 6.7 | 13.4 |
| 2,2,4-trimethyl-1,3-pentanediol monoisobutyrate | 13.3 | 13.3 | 13.3 |
| copolymer latex of 85% vinyl acetate and 15% 2 ethyl hexyl acrylate, having an average polymer particle size of 3480 A and a Tg = 9°C | 310.5 | 310.5 | 310.5 |
| Pigment-volume-concentration (PVC) | 52 | 52 | 52 |

The foregoing paints were tested for paint film properties and are reported in Table 1. Scattering is defined as "S" = Kubelka-Munk Scattering Coefficient and units are reciprocal mils (mil$^{-1}$). Contrast ratio is reported as the dry film thickness required to give a contrast ratio of 0.98 wherein X(0.98) = dry film thickness which gives a contrast ratio over Lenata Form 3B opacity chart of 0.98. See Reflectance Spectroscopy, p. 106 et. seq., (Springs-Verlog, N.Y., 1969) wherein opacity is determined with Kubelka-Munk solution for multiple light scattering. Enamel holdout is tested by applying 3 mils wet film on a Lenata 3B opacity chart and air dried for 16 hours, whereupon 1.5 wet mils of alkyd (poor holdout properties) is applied and dried for 24 hours. A sealed panel is similarly coated with 1.5 wet mils of the same alkyd. Enamel holdout is reported as the ratio (percent) of gloss of test paint panel over the gloss over the sealed substrate panel.

TABLE 1

| TEST | PRIOR ART CONTROL | PAINT A | PAINT B |
| --- | --- | --- | --- |
| Scattering "S" | 3.1 m$^{-1}$ | 4.3 m$^{-1}$ | 3.8 m$^{-1}$ |
| Contrast Ratio "X(0.98)" | 3.0 | 2.1 | 2.6 |
| Enamel holdout | 69.7% | 63.3% | 64.4% |

EXAMPLE 2

Intermediate quality pigmented latex emulsion paints at high pigment loading are prepared by dispersing the following indicated ingredients in a pebble mill for 24 hours to produce a latex paint.

| Material | Prior Art Control Paint (pounds) | Paint A (pounds) | Paint B (pounds) |
| --- | --- | --- | --- |
| H$_2$O | 270.2 | 271.6 | 272.0 |
| 3% aqueous solution of hydroxy ethyl cellulose | 150.0 | 150.0 | 150.0 |
| 15% water solution of sodium salt of polymethacrylic acid | 7.1 | 7.1 | 7.1 |
| Anti-foaming agent (Nopco 2219 A) | 2.0 | 2.0 | 2.0 |
| Non-ionic surfactant of iso-octyl phenoxy polyethoxy ethanol containing 9–10 units ethylene oxide per mole of phenol (Triton X-100) | 2.0 | 2.0 | 2.0 |
| 30% mixture of phenyl mercury acetate | 1.0 | 1.0 | 1.0 |
| Rutile TiO$_2$ | 214.8 | 180.1 | 145.4 |
| Calcined clay | 90.2 | 90.2 | 90.2 |
| Calcium carbonate | 290.7 | 290.7 | 290.7 |
| Synthetic porous magnesium silicate (Britesorb) | 0 | 6.7 | 13.3 |
| 2,2,4-trimethyl-1,3-pentanediol monoisobutyrate | 9.0 | 9.0 | 9.0 |
| Copolymer latex of 85% vinyl acetate and 15% 2 ethyl hexyl acrylate | 207.0 | 207.0 | 207.0 |

The foregoing paints were tested for paint film properties in the manner set forth in Example 1, and the results are listed in the following Table 2.

TABLE 2

| Test | Prior Art Control | Paint A | Paint B |
| --- | --- | --- | --- |
| Scattering "S" | 5.3 m$^{-1}$ | 5.8 m$^{-1}$ | 5.7 m$^{-1}$ |
| Contrast Ratio "X(0.98)" | 1.85 mils | 1.7 mils | 1.7 mils |
| Enamel holdout | 3.8% | 4.0% | 4.0% |

The foregoing description and examples indicate that improved pigmented opacified latex paint can be formulated by the inclusion of porous magnesium silicate particles for at least a portion of the opacifying pigment contained in latex paint composition. The porous structure of the magnesiumm silicate in combination with TiO$_2$ (for example) substantially reduces the TiO$_2$ requirements as well as substantially improving hiding and opacity of the paint films. The foregoing description and examples are illustrative only and not intended to be limiting, except by the appended claims.

We claim:

1. In an opacified aqueous dispersion paint composition having film-forming latex binder and between about 5% and 50% opacifying pigment on a dry solid volume basis, the improvement comprising:

said opacifying pigment comprising titanium dioxide and porous synthetic magnesium silicate wherein said paint contains between about 1% to 30% of said porous synthetic magnesium silicate on a dry solid volume basis, said porous synthetic magnesium silicate having a porosity of between about 30% and 80% by volume and pore diameters between about 0.03 microns and 0.9 microns, said porous magnesium silicate having an average particle size between about 5 to 20 microns; and said film-forming latex binder particles being between about 1000 A and 10,000 A.

2. The paint in claim 1 wherein the porous magnesium silicate has a surface area between about 80 to 300 square meters per gram.

* * * * *